United States Patent
Zhang et al.

(10) Patent No.: US 10,750,492 B2
(45) Date of Patent: Aug. 18, 2020

(54) RESOURCE ASSIGNMENT IN NR-SS

(71) Applicant: QUALCOMM Incorporated, San Diego, CA (US)

(72) Inventors: Xiaoxia Zhang, San Diego, CA (US); Kapil Bhattad, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/224,154

(22) Filed: Dec. 18, 2018

(65) Prior Publication Data
US 2019/0239198 A1    Aug. 1, 2019

Related U.S. Application Data

(60) Provisional application No. 62/608,341, filed on Dec. 20, 2017.

(51) Int. Cl.
*H04W 72/04* (2009.01)
*H04L 5/00* (2006.01)
*H04W 72/08* (2009.01)

(52) U.S. Cl.
CPC ......... *H04W 72/044* (2013.01); *H04L 5/0007* (2013.01); *H04L 5/0042* (2013.01);
(Continued)

(58) Field of Classification Search
CPC . H04W 72/044; H04W 72/04; H04W 72/082; H04W 72/042; H04L 5/0094;
(Continued)

(56) References Cited

U.S. PATENT DOCUMENTS

| | | | | |
|---|---|---|---|---|
| 2015/0333944 | A1* | 11/2015 | Bae | H04L 25/03821 375/296 |
| 2018/0352537 | A1* | 12/2018 | Zhang | H04W 72/04 |
| 2019/0140807 | A1* | 5/2019 | Wang | H04L 5/003 |

FOREIGN PATENT DOCUMENTS

EP    2439995 A2    4/2012

OTHER PUBLICATIONS

Ericsson: "On Resource Allocation Schemes", 3GPP Draft; R1-1706154, 3rd Generation Partnership Project (3GPP), Mobile Competence Centre, 650, Route Des Lucioles ; F-06921 Sophia-Antipolis Cedex, France, vol. RAN WG1, No. Spokane, WA, USA; Apr. 3, 2017-Apr. 7, 2017, Apr. 2, 2017 (Apr. 2, 2017), XP051244259, 2 Pages, Retrieved from the Internet: URL: http://www.3gpp.org/ftp/Meetings_3GPP_SYNC/RAN1/Docs/ [retrieved on Apr. 2, 2017].
(Continued)

*Primary Examiner* — Pao Sinkantarakorn
*Assistant Examiner* — Kabir U Jahangir
(74) *Attorney, Agent, or Firm* — Norton Rose Fulbright LLP

(57) ABSTRACT

Certain aspects of the present disclosure relate to a method and apparatus for receiving a medium occupation and a resource block group (RBG) size from a gNB, wherein the radio block group size is based on a bandwidth part (BWP) configuration. In one example, UEs with smaller BWP have finer granularity in RBG size in terms of PRBs, while UEs with larger BWP may have a coarser granularity in RBG size in terms of PRBs. An additional guard band may be used if the gNB reserves some channels such that not all of the BW is occupied. For example, if the gNB reserves the 20 MHz channel, it may perform better by adding additional guard band on each side of the 20 MHz bandwidth to accommodate an adjacent channel leakage-power ratio (ACLR). Another aspect of the present disclosure relates to assigning a UE an interlace with equally spaced PRBs.

30 Claims, 16 Drawing Sheets

(52) U.S. Cl.
CPC .......... *H04L 5/0094* (2013.01); *H04W 72/04* (2013.01); *H04W 72/042* (2013.01); *H04W 72/082* (2013.01); *H04L 5/0041* (2013.01); *H04L 5/0044* (2013.01); *H04L 5/0048* (2013.01); *H04L 5/0053* (2013.01)

(58) Field of Classification Search
CPC ... H04L 5/0042; H04L 5/0007; H04L 5/0041; H04L 5/0053; H04L 5/0044; H04L 5/0048
See application file for complete search history.

(56) References Cited

OTHER PUBLICATIONS

International Search Report and Written Opinion—PCT/US2018/066351—ISA/EPO—dated Mar. 20, 2019.
NEC: "Frequency and Time Resource Allocation Schemes for NR", 3GPP Draft; R1-1707200, Freq-Time Resource Allocation Schemes_V1B, 3rd Generation Partnership Project (3GPP), Mobile Competence Centre, 650, Route Des Lucioles ; F-06921 Sophia-Antipolis Cedex, France, vol. RAN WG1, No. Hangzhou; May 15, 2017-May 19, 2017, May 6, 2017 (May 6, 2017), XP051261714, pp. 1-5, Section 2, Retrieved from the Internet: URL: http://www.3gpp.org/ftp/tsg_ran/WG1_RL1/TSGR1_89/Docs/ [retrieved on May 6, 2017].

* cited by examiner

| Medium Occupation Indication | RBG size |
|---|---|

FIG. 6

| One channel (20MHz) | RBG size X1 |
|---|---|
| Two channels (40MHz) | RBG size X2 |
| Three channels (60MHz) | RBG size X3 |
| Four channels (80MHz) | RBG size X4 |

Medium occupation to RBG mapping table
(can be UE specific)

FIG. 7

| Medium ocupation indication indicated using a bitmap on PDCCH | RB allocation within the occupied channels interpreted based on an implicit mapping between RBG size and medium occupation |

FIG. 8

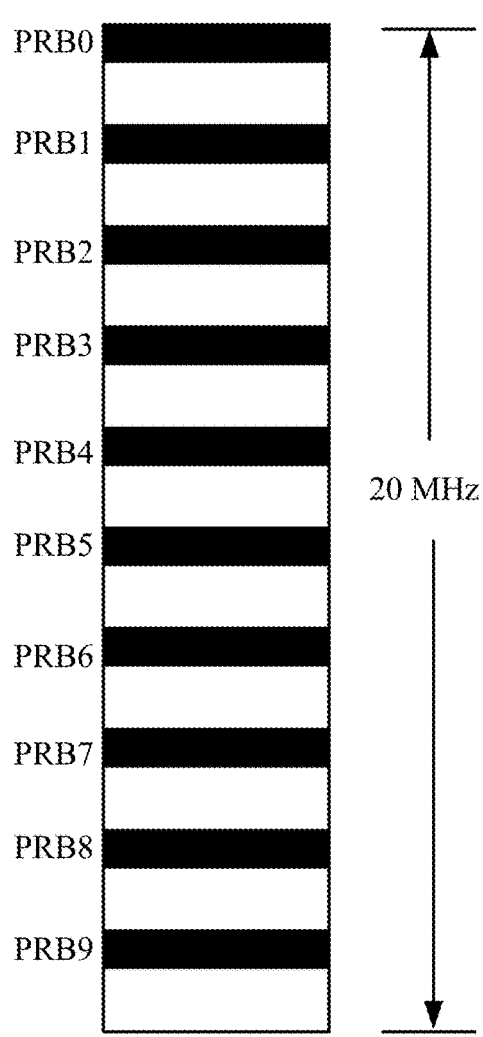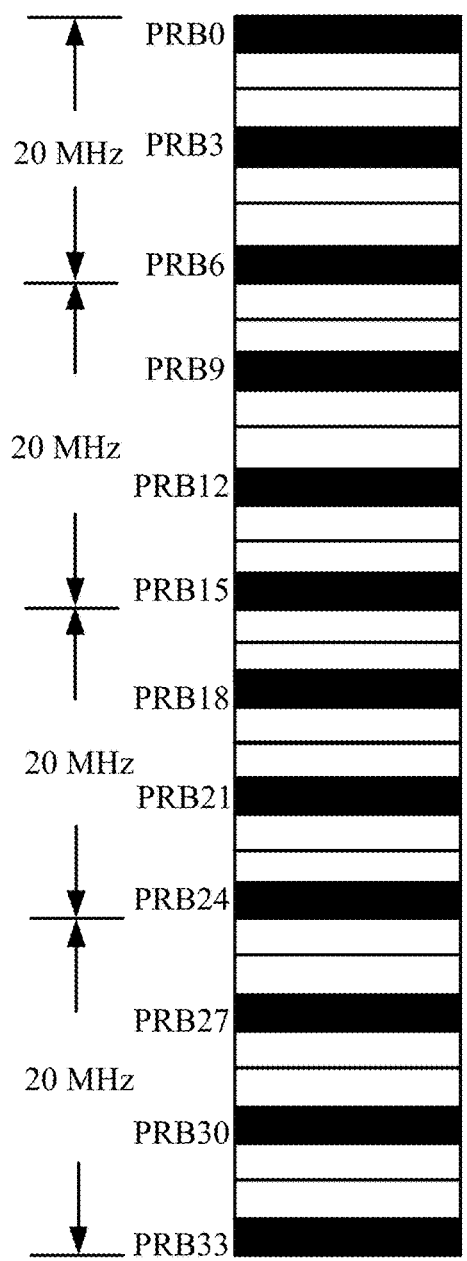
FIG. 12B
FIG. 12C

RESOURCE ASSIGNMENT IN NR-SS

This application claims priority to and the benefit of U.S. Provisional Patent Application No. 62/608,341, entitled "RESOURCE ASSIGNMENT IN NR-SS," filed in the United States Patent and Trademark Office on Dec. 20, 2017, the entire content of which is incorporated herein by reference as is fully set forth below in its entirety and for all applicable purposes.

BACKGROUND

Field of Disclosure

The following relates generally to unlicensed, wireless communication, and more specifically to uplink communications.

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

SUMMARY

A method, and apparatus for receiving resources at a user equipment (UE) is described. The method, and apparatus may include applying a listen-before-talk (LBT) procedure for sending a medium, and receiving information comprising a medium occupation and a resource block group (RBG) size from a gNB, wherein the resource block group size is based on a medium occupation.

In another example, the method and apparatus further comprises a node with smaller channel occupancy using a finer RBG granularity in signalling and a node with larger channel occupancy using a coarser RBG granularity in signalling.

In another example, the method and apparatus further comprises receiving an additional guard band around an occupied medium, wherein the guard band is assigned around the occupied medium to avoid adjacent channel leakage-power if a node is not able to access the adjacent channels.

In another example, there is there is an implicit mapping between the RBG size and the medium occupancy.

In another example, the method and apparatus further involves reducing resource allocation (RA) overhead by receiving a starting PRB, RBG, or interlace, receiving a number of the RBs, RBGs, or interlaces across channels including those channels without medium access, and automatically skipping PRBs, RBGs, or interlaces in the guard band and in unoccupied channels.

In still another example, the method and apparatus further involves reducing resource allocation (RA) overhead by joint coding a resource allocation (RA) indication and a medium occupation index comprising, indicating a starting PRB in a first allocated channel and an end PRB in a last allocated channel, and indicating medium occupancy on the first and last allocated channel.

Also, another method, and apparatus is described which includes assigning a UE an interlace with equally spaced PRBs across a channel or assigning an interlace of equally spaced PRBs across a plurality of channels within a system bandwidth.

BRIEF DESCRIPTION OF THE DRAWINGS

FIG. 6 discloses a message from the RRC called the RRC configuration message which carries a medium occupation indication and an RB allocation within the occupied channels;

FIG. 7 shows a medium occupation to RBG size mapping for one to four channels, where 20 MHz equals one channel, 40 MHz equals two channels, 60 MHz equals three channels and 80 MHz equals four MHz;

FIG. 8 discloses using a bitmap to configure a UE with a channel and an RBG size;

FIG. 12B is an interlace within a 20 MHz channel which is composed of ten equally spaced physical resource blocks;

FIG. 12C is an interlace within a system bandwidth of 80 MHz comprising four 20 MHz channels where the PRBs are equally spaced 3 PRBs apart;

DETAILED DESCRIPTION

Figure 1:
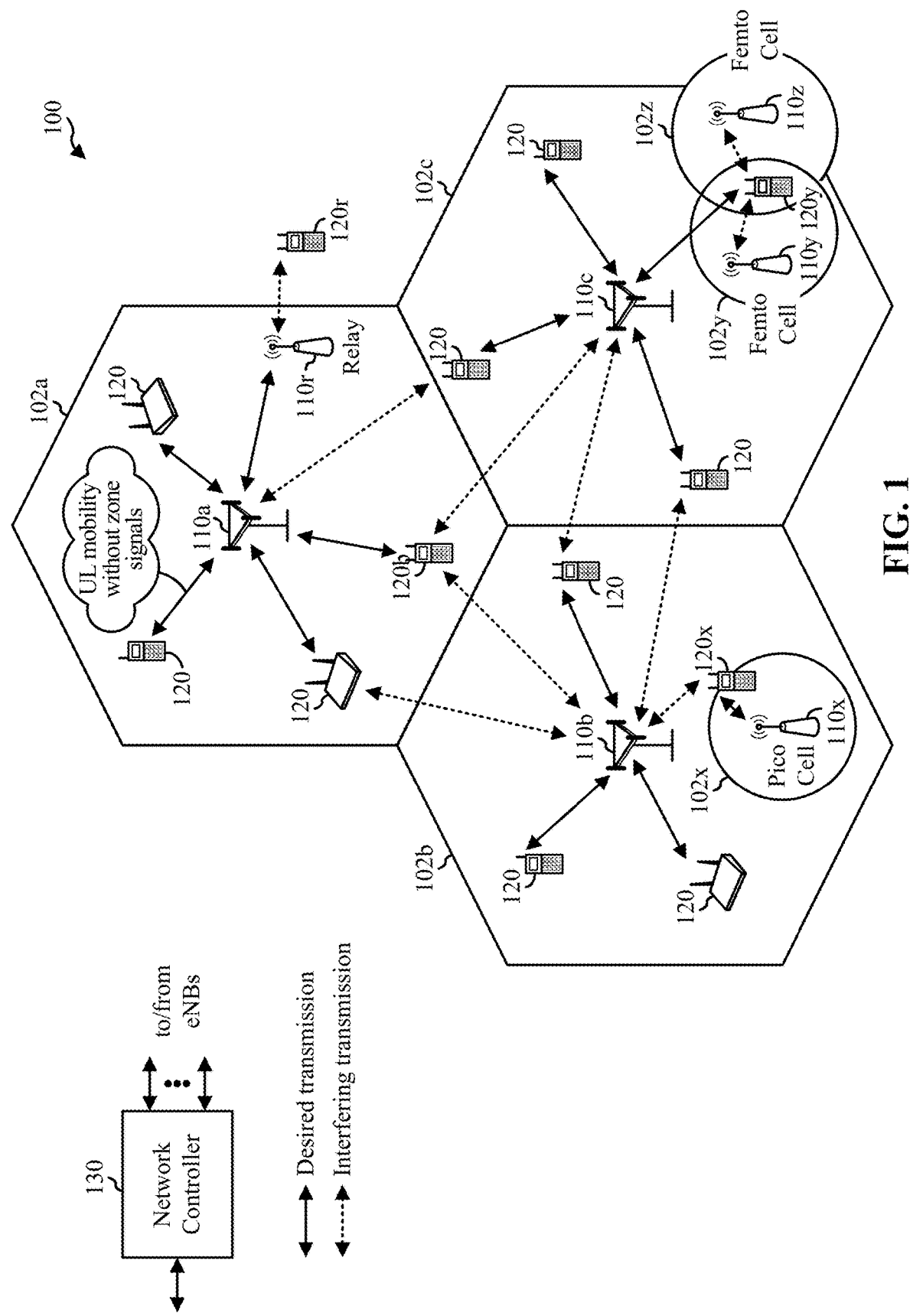
FIG. 1 is a block diagram conceptually illustrating an example telecommunications system, in accordance with certain aspects of the present disclosure.

With 5G NR, subcarrier spacing may be scaled. Also, the waveforms selected for 5G include cyclic prefix-orthogonal frequency-division multiplexing (CP-OFDM) and DFT-Spread (DFT-S) OFDM. In addition, 5G allows for switching between both CP OFDM and DFT-S-OFDM on the uplink to get the MIMO spatial multiplexing benefit of CP-OFDM and the link budget benefit of DFT-S OFDM. With LTE, orthogonal frequency-division multiple access (OFDMA) communications signals may be used for downlink communications, while Single-Carrier Frequency-Division Multiple Access (SC-FDMA) communications signals may be used for LTE uplink communications. The DFT-s-OFDMA scheme spreads a plurality of data symbols (i.e., a data symbol sequence) over a frequency domain which is different from the OFDMA scheme. Also, in comparison to the OFDMA scheme, the DFT-s-OFDMA scheme can greatly reduce a PAPR of a transmission signal. The DFT-s-OFDMA scheme may also be referred to as an SC-FDMA scheme.

Scalable OFDM multi-tone numerology is another feature of 5G. Prior versions of LTE supported a mostly fixed OFDM numerology of 15 kHz spacing between OFDM tones (often called subcarriers) and carrier bandwidths up to 20 MHz. Scalable OFDM numerology has been introduced in 5G to support diverse spectrum bands/types and deployment models. For example, 5G NR is able to operate in mmWave bands that have wider channel widths (e.g., 100s of MHz) than currently in use in LTE. Also, the OFDM subcarrier spacing is able to scale with the channel width, so the FFT size scales such that processing complexity does not increase unnecessarily for wider bandwidths. In the present application, numerology refers to the different values different features of a communication system can take such as subcarrier spacing, cyclic prefix, symbol length, FFT size, TTI, etc.

Also in 5G NR, cellular technologies have been expanded into the unlicensed spectrum, both stand-alone and licensed-assisted (LAA). In addition, the unlicensed spectrum may occupy frequencies up to 60 GHz also known as mmWave. The used of unlicensed bands provides added capacity.

A first member of this technology family is referred to as LTE Unlicensed or LTE-U. By aggregating LTE in unlicensed spectrum with an 'anchor' channel in licensed spectrum, faster downloads are enabled for customers. Also, LTE-U shares the unlicensed spectrum fairly with Wi-Fi. This is an advantage because in the 5 GHz unlicensed band where Wi-Fi devices are in wide use, it is desirable for LTE-U to coexist with the Wi-Fi. However, an LTE-U network may cause RF interference to an existing co-channel Wi-Fi device. Choosing a preferred operating channel and minimizing the interference caused to nearby Wi-Fi networks is a goal for LTE-U devices. However, the LTE-U single carrier (SC) device may operate on the same channel as Wi-Fi if all available channels are occupied by Wi-Fi devices. To coordinate spectrum access between LTE-U and Wi-Fi, the energy across the intended transmission band is first detected. This energy detection (ED) mechanism informs the device of ongoing transmissions by other nodes. Based on this ED information, a device decides if it should transmit. Wi-Fi devices do not back off to LTE-U unless its interference level is above an energy detection threshold (−62 dBm over 20 MHz). Thus, without proper coexistence mechanisms in place, LTE-U transmissions could cause considerable interference on a Wi-Fi network relative to Wi-Fi transmissions.

Licensed Assisted Access or LAA is another member of the unlicensed technology family. Like LTE-U, it also uses an anchor channel in licensed spectrum. However, it also adds "listen before talk" (LBT) to the LTE functionality.

A gating interval may be used to gain access to a channel of a shared spectrum. The gating interval may determine the application of a contention-based protocol such as an LBT protocol. The gating interval may indicate when a Clear Channel Assessment (CCA) is performed. Whether a channel of the shared unlicensed spectrum is available or in use is determined by the CCA. If the channel is "clear" for use, i.e., available, the gating interval may allow the transmitting apparatus to use the channel. Access to the channel is typically for a predefined transmission interval and allows the channel to be used by a gNB and UEs communicating with the gNB. Thus, with unlicensed spectrum, a "listen before talk" procedure is performed before transmitting a message. If the channel is not cleared for use, then a device will not transmit.

Another member of this family of unlicensed technologies is LTE-WLAN Aggregation or LWA which utilizes both LTE and Wi-Fi. Accounting for both channel conditions, LWA can split a single data flow into two data flows which allows both the LTE and the Wi-Fi channel to be used for an application. Instead of competing with Wi-Fi, the LTE signal is using the WLAN connections seamlessly to increase capacity.

The final member of this family of unlicensed technologies is MulteFire. MuLTEfire opens up new opportunities by operating 4G LTE technology solely in unlicensed spectrum such as the global 5 GHz. Unlike LTE-U and LAA, Multe-Fire allows entities without any access to licensed spectrum. Thus, it operates in unlicensed spectrum on a standalone basis, that is, without any anchor channel in the licensed spectrum. Thus, MulteFire differs from LTE-U. LAA and LWA because they aggregate unlicensed spectrum with an anchor in licensed spectrum Without relying on licensed spectrum as the anchoring service, MulteFire allows for Wi-Fi like deployments. A MulteFire network may include access points (APs) and/or base stations 105 communicating in an unlicensed radio frequency spectrum band, e.g., without an licensed anchor carrier.

The (DRS Measurement Timing Configuration) is a technique that allows MulteFire to transmit but with minimal interference to other unlicensed technology including Wi-Fi. Additionally, the periodicity of discovery signals is very sparse. This allows Multefire to access channels occasionally, transmit discovery and control signals, and then vacate the channels. Since the unlicensed spectrum is shared with other radios of similar or dissimilar wireless technologies, a so-called listen-before-talk (LBT) method is applied for channel sensing. LBT involves sensing the medium for a predefined minimum amount of time and backing off if the channel is busy. Therefore, the initial random access (RA) procedure for standalone LTE-U should involve as few transmissions as possible and also have low latency, such that the number of LBT operations can be minimized and the RA procedure can then be completed as quickly as possible.

Leveraging a DMTC (DRS Measurement Timing Configuration) window, MulteFire algorithms search and decode reference signals in unlicensed band from neighboring base stations in order to know which base station would be best for serving the user. As the caller moves past one base station, their UE sends a measurement report to it, triggering a handover at the right moment, and transferring the caller (and all of their content and information) to the next base station.

Since LTE traditionally operated in licensed spectrum and Wi-Fi operated in unlicensed bands, coexistence with Wi-Fi or other unlicensed technology was not considered when LTE was designed. In moving to the unlicensed world, the LTE waveform was modified and algorithms were added in order to perform Listen Before Talk (LBT). This allows us to respect unlicensed incumbents including Wi-Fi by not just acquiring a channel and immediately transmitting. The present example supports LBT and the detection and transmission of WCUBS (Wi-Fi Channel Usage Beacon Signal) for ensuring coexistence with Wi-Fi neighbors.

MulteFire was designed to "hear" a neighboring Wi-Fi base station's transmission (because it's all unlicensed spectrum). MulteFire listens first, and autonomously makes the decision to transfer when there is no other neighboring Wi-Fi transmitting on the same channel. This technique ensures co-existence between MulteFire and Wi-Fi.

Additionally, we adhere to the unlicensed rules and regulations set by 3GPP and the European Telecommunications Standards Institute (ETSI), which mandates the −72 dBm LBT detection threshold. This further helps us de-conflict with Wi-Fi. MulteFire's LBT design is identical to the standards defined in 3GPP for LAA/eLAA and complies with ETSI rules.

An expanded functionality for 5G involves the use of 5G NR Spectrum Sharing, or NR-SS. 5G spectrum sharing enables enhancement, expansion, and upgrade of the spectrum sharing technologies introduced in LTE. These include LTE Wi-Fi Aggregation (LWA), License Assisted Access (LAA), enhanced License Assisted Access (eLAA), and CBRS/License Shared Access (LSA).

Aspects of the disclosure are initially described in the context of a wireless communication system. Aspects of the disclosure are then illustrated by and described with reference to apparatus diagrams, system diagrams, and flowcharts that relate to receiving on transmit and transmitting on receive.

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS 110 may be a station that communicates with UEs 120. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, 5G Radio NodeB (gNB), or TRP may be interchangeable. In some examples, a cell may not necessarily be stationary, and the geographic area of the cell may move according to the location of a mobile base station 120. In some examples, the base stations 110 may be interconnected to one another and/or to one or more other base stations 110 or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs in a Closed Subscriber Group (CSG), UEs for users in the home, etc.). A BS 110 for a macro cell may be referred to as a macro BS 110. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices. In NB IoT, the UL and DL have higher periodicities and repetitions interval values as a UE decodes data in extended coverage.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the sole entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP), or gNB) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
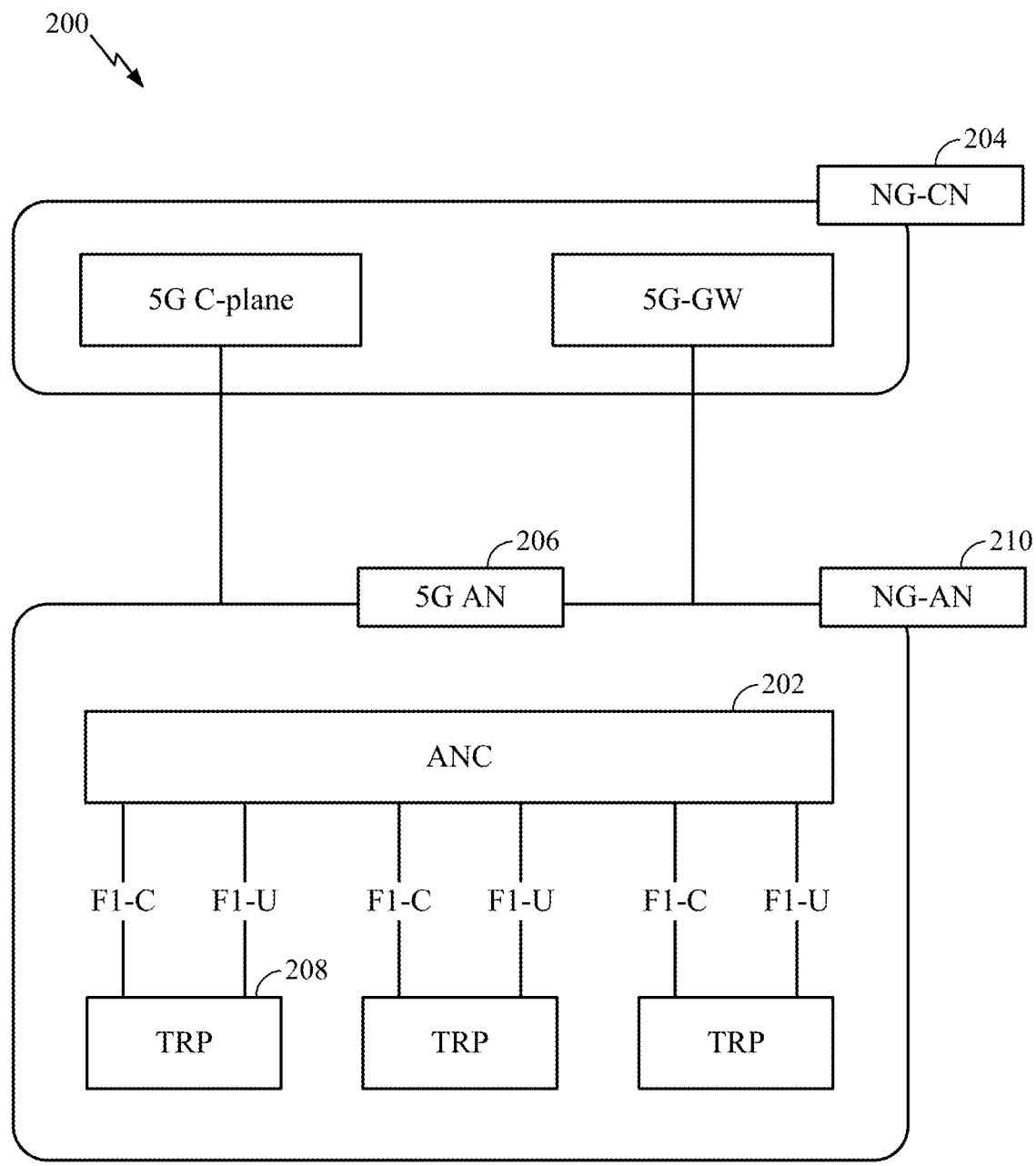
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, eNB, gNB, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
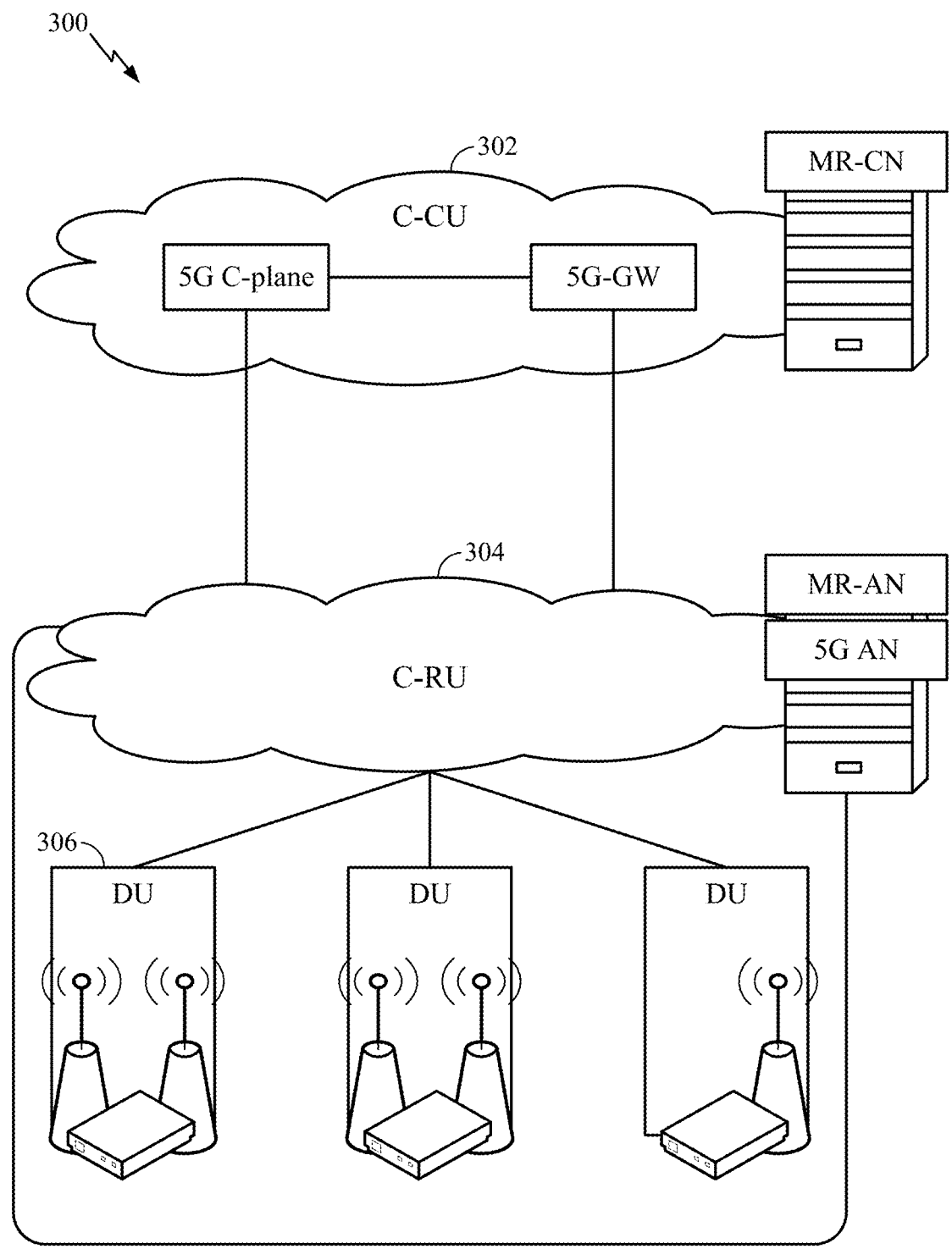
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
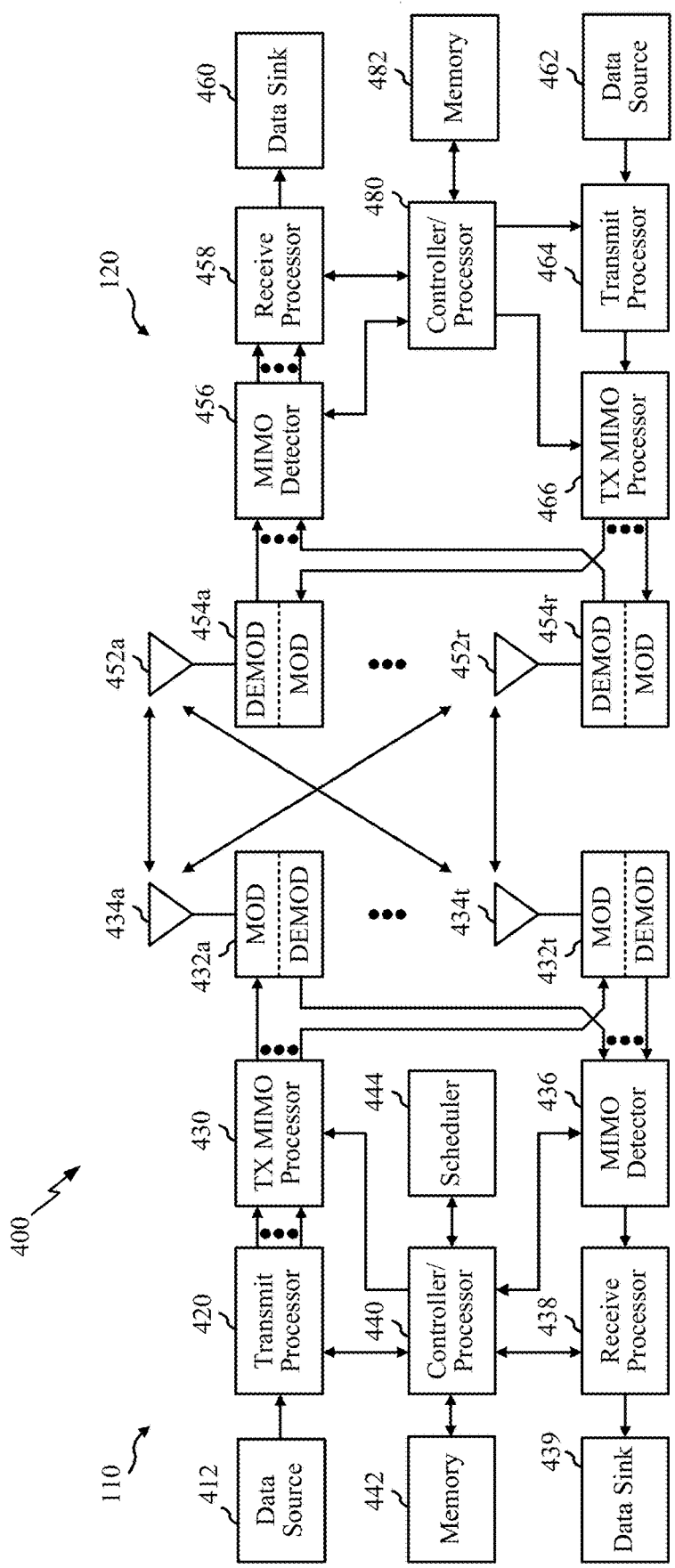
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 6-13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5A:
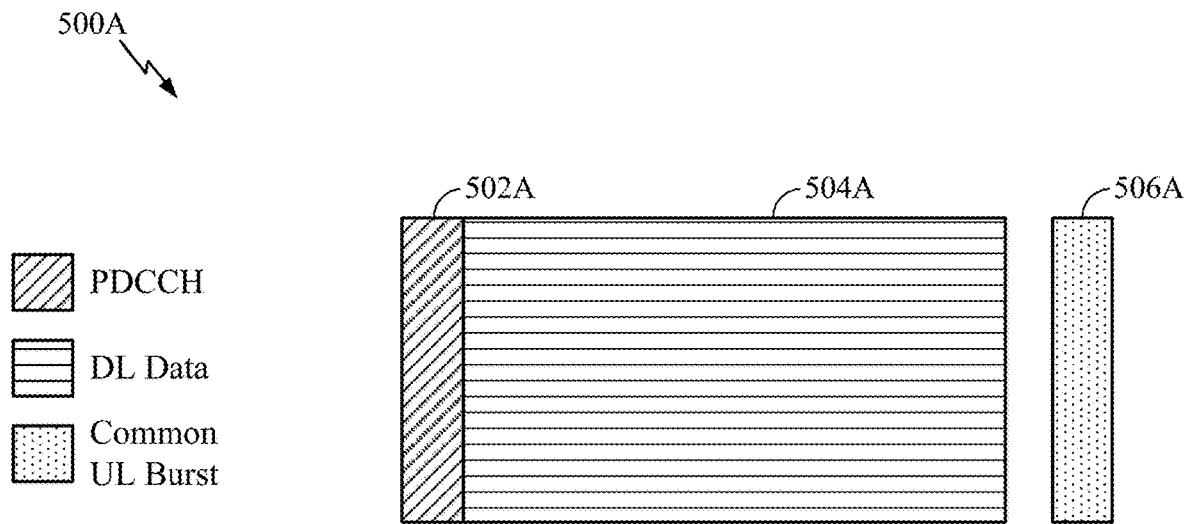
FIG. 5A is a diagram illustrating an example of a downlink (DL)-centric subframe according to some aspects of the present disclosure.

FIG. 5A is a diagram 500A showing an example of a DL-centric subframe. The DL-centric subframe may include a control portion 502A. The control portion 502A may exist in the initial or beginning portion of the DL-centric subframe. The control portion 502A may include various scheduling information and/or control information corresponding to various portions of the DL-centric subframe. In some configurations, the control portion 502A may be a physical DL control channel (PDCCH), as indicated in FIG. 5A. The DL-centric subframe may also include a DL data portion 504A. The DL data portion 504A may sometimes be referred to as the payload of the DL-centric subframe. The DL data portion 504A may include the communication resources utilized to communicate DL data from the scheduling entity 202 (e.g., eNB, BS, Node B, 5G NB, TRP, gNB, etc.) to the subordinate entity, e.g., UE 120. In some configurations, the DL data portion 504A may be a physical DL shared channel (PDSCH). The DL-centric subframe may also include a common UL portion 506A. The common UL portion 506A may sometimes be referred to as an UL burst, a common UL burst, and/or various other suitable terms. The common UL portion 506A may include feedback information corresponding to various other portions of the DL-centric subframe. For example, the common UL portion 506 may include feedback information corresponding to the control portion 502A. Non-limiting examples of feedback information may include an ACK signal, a NACK signal, a HARQ indicator, and/or various other suitable types of information. The common UL portion 506A may include additional or alternative information, such as information pertaining to random access channel (RACH) procedures, scheduling requests (SRs), sounding reference signals (SRS) and various other suitable types of information. As illustrated in FIG. 5A, the end of the DL data portion 504A may be separated in time from the beginning of the common UL portion 506A. This time separation may sometimes be referred to as a gap, a guard period, a guard interval, and/or various other suitable terms. This separation provides time for the switchover from DL communication (e.g., reception operation by the subordinate entity, e.g., UE 120) to UL communication (e.g., transmission by the subordinate entity e.g., UE 120). One of ordinary skill in the art will understand, however, that the foregoing is merely one example of a DL-centric subframe and alternative structures having similar features may exist without necessarily deviating from the aspects described herein.

Figure 5B:
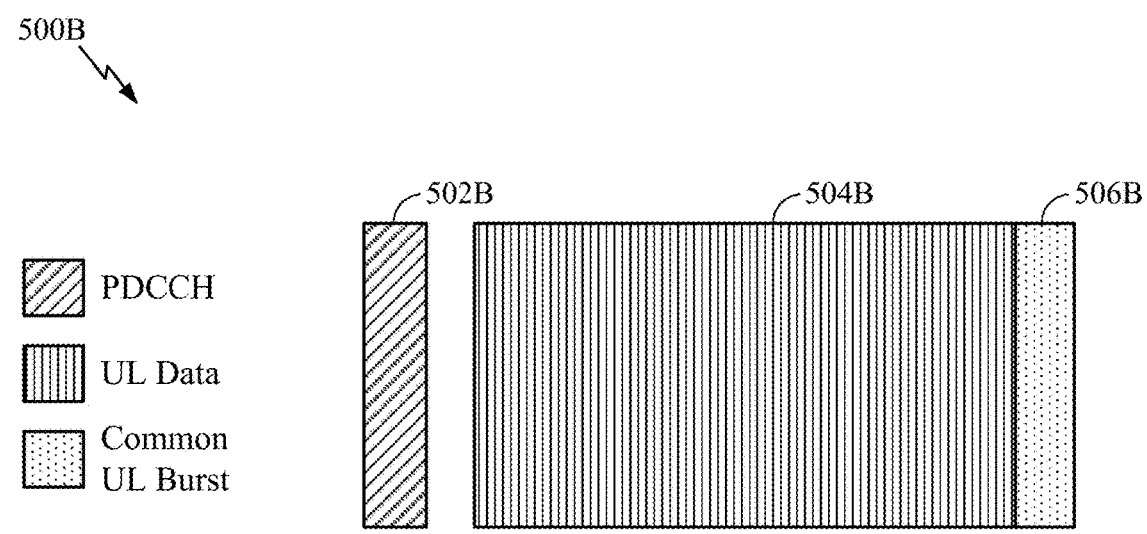
FIG. 5B is a diagram illustrating an example of an uplink (UL)-centric subframe according to some aspects of the present disclosure.

FIG. 5B is a diagram 500B showing an example of an UL-centric subframe. The UL-centric subframe may include a control portion 502B. The control portion 502B may exist in the initial or beginning portion of the UL-centric subframe. The control portion 502B in FIG. 5B may be similar to the control portion 502A described above with reference to FIG. 5A. The UL-centric subframe may also include an UL data portion 504B. The UL data portion 504B may sometimes be referred to as the payload of the UL-centric subframe. The UL portion may refer to the communication resources utilized to communicate UL data from the subordinate entity, e.g., UE 120 to the scheduling entity 202 (e.g., eNB). In some configurations, the control portion 502B may be a physical UL shared channel (PUSCH). As illustrated in FIG. 5B, the end of the control portion 502B may be separated in time from the beginning of the UL data portion 504B. This time separation may sometimes be referred to as a gap, guard period, guard interval, and/or various other suitable terms. This separation provides time for the switchover from DL communication (e.g., reception operation by the scheduling entity 202) to UL communication (e.g., transmission by the scheduling entity 202). The UL-centric subframe may also include a common UL portion 506B. The common UL portion 506B in FIG. 5B may be similar to the common UL portion 506A described above with reference to FIG. 5A. The common UL portion 506B may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In summary, a UL centric subframe may be used for transmitting UL data from one or more mobile stations to a base station, and a DL centric subframe may be used for transmitting DL data from the base station to the one or more mobile stations. In one example, a frame may include both UL centric subframes and DL centric subframes. In this example, the ratio of UL centric subframes to DL subframes in a frame may be dynamically adjusted based on the amount of UL data and the amount of DL data that need to be transmitted. For example, if there is more UL data, then the ratio of UL centric subframes to DL subframes may be increased. Conversely, if there is more DL data, then the ratio of UL centric subframes to DL subframes may be decreased.

Resource Assignment in NR-SS

A resource element (RE) may cover one subcarrier in one symbol period and may be used to send one modulation symbol, which may be a real or a complex value. Resource elements may be grouped into physical resource blocks (PRB). In LTE, a PRB is a time/frequency resource of 180 kHz (12 subcarriers) by 0.5 msec or 1 slot. Each slot has 6 or 7 symbols, 6 for extended CP and 7 symbols for normal CP. Physical resource blocks (PRB) may be grouped into larger radio resources called Resource Block Groups (RBG). NR may have different subcarrier spacing from LTE. Hence, the PRB may span a different frequency bandwidth.

The way in which the scheduler allocates resource blocks for each transmission is specified by a Resource Allocation Type. Using a string of a bit map (bit stream) provides a way to give the maximum flexibility of allocating resource blocks where each bit represents one of the resource blocks. Although this approach may result in maximum flexibility, it may create too much overhead (e.g., a long bit map) along with a complicated way to allocate the resources. So a couple of resource allocation types were introduced by LTE to address this problem. A predefined process is used by each of the resource allocation types. In LTE there are three different resource allocation types, Resource Allocation Type 0, 1, 2. See Table 1 below.

TABLE 1

| DCI Format | Type | Memo |
| --- | --- | --- |
| 1 | Type 0 or Type 1 | Determined by resource allocation header field |
| 1A | Type 2 | |
| 1B | Type 2 | |
| 1C | Type 2 | |
| 1D | Type 2 | |
| 2 | Type 0 or Type 1 | Determined by resource allocation header field |
| 2A | Type 0 or Type 1 | Determined by resource allocation field |

Note the Table 1 list is the current definition of Resource Allocation Types in LTE.

Different feedback and resource granularities, in multiples of PRBs can be used with NR. In LTE, for a system bandwidth of 10 MHz, the 3GPP standard specifies a resource unit granularity for a RBG size of 3 PRBs, that specifies the smallest amount of resources the BS scheduler can assign to a UE (in resource allocation type 0). In NR, the RBG size may be different from LTE.

Resource Allocation Type 0 allocates resources by first dividing resource blocks into multiples of resource block groups (RBG). The number of physical resource blocks in each resource block group (RBG) varies with the system bandwidth. The RBG size will vary with the system bandwidth. The relationship between RBG size (the number of physical resource blocks (PRB) in a resource block group (RBG)) and the system bandwidth in LTE is shown in Table 2 below.

TABLE 2

| System Bandwidth (MHz) | RBG Size (in PRBs) |
| --- | --- |
| 1.4 | 1 |
| 3 | 2 |
| 5 | 2 |
| 10 | 3 |
| 15 | 4 |
| 20 | 4 |

Like LTE discussed above, NR agreed to support different RBG sizes depending on the configured bandwidth part (BWP), where RGB size is measured by the number of PRBs and BWP is the part of the system BW that the UE will be using. UEs with different bandwidth part (BWP) configuration may have different RBG size. This allows UE with smaller BWP to have more precise or finer RBG granularity in signalling or smaller RBG size in terms of PRBs, while UEs with larger BWP may have a coarser granularity in RBG size or larger RBG size in terms of PRBs. As shown in Table 3 below, for a system BW of 1.4 MHz, the granularity is 1 PRB, while for a system BW of 20 MHz, the granularity is 4 PRB. This is one example of RBG size (or granularity in PRBs) vs. configured bandwidth part (BWP).

TABLE 3

| Configured BWP (MHz) | RBG Size (in PRBs) |
| --- | --- |
| 1.4 | 1 |
| 3 | 2 |
| 5 | 2 |
| 10 | 3 |
| 15 | 4 |
| 20 | 4 |

A UE may open up (or use) its RF resources based on the BWP configuration for better power consumption. For example, in an 80 MHz system, the UE may use less than the 80 MHz to save power by using only 20 MHz or 40 MHz, where the system can have up to 80 Mhz bandwidth. The BWP is expected to be contiguous in NR configuration (to minimize the RF cost). For example, if a UE uses 20 MHz, only one filter may be used if two 10 MHz channels are contiguous, while two filters may have to be used if the two 10 MHz channels are located at opposite ends of the 80 MHz spectrum. A physical resource block group (RBG) has PHY/MAC parameters (such as active DFT-spreading, TTI length, tight/relaxed time-frequency alignment, or waveform parameters). One reason NR can provide a configurable air interface is because different RBGs may have different numerologies and parameters. For example, 720 kHz or 1440 kHz in frequency and 1 ms in time (which corresponds to 12 subcarriers and 14 symbols) are two example sizes for resource block groups (RBG). TTI (Transmission Time Interval) is the smallest scheduling time interval in LTE.

In NR-SS, for each transmission opportunity (TXOP), a node may be able to access the medium with a successful LBT outcome and reserve one channel or multiple channels depending on the medium sensing. That is, if channels are sensed by the UE during a listen before talk (LBT) procedure to be currently occupied by another node, e.g., a WiFi node, the UE can't use them to transmit information. (A transmission opportunity (TXOP) is granted by an access point to a terminal and refers to duration of time during which the station can send frames). For example, in a 80 MHz system, a node may occupy 80, 60, 40, or 20 MHz depending on how many channels the neighbor WiFi nodes occupy, where each WiFi channel access is defined to be 20 MHz. In addition, the channels occupied by WiFi nodes may not be contiguous within 80 MHz.

The UE or gNB does medium sensing to coexist with WiFi. A node (either UE or gNB) can't use a channel without first having a successful LBT procedure for that channel. In this example, if the BWP of the node is 80 MHz, the node may use RF resources for the entire 80 MHz and could transmit on the entire 80 MHz if it can access the medium with a successful LBT outcome and reserve all four 20 MHz channels. However, if the result of the LBT procedure is a 20 MHz channel is unoccupied, the RBG size can be reduced. Because of medium sensing, the RBG size can be adjusted once the medium occupancy is known.

In one example, the method and apparatus has a coarser (or larger) RBG size when a node is able to access the medium with a successful LBT outcome and reserves more channels for a UE, while having a finer (or smaller) RBG granularity when a node is able to access the medium with a successful LBT outcome and reserves less channels with RBG based resource allocation. In a first example, RBG size can be dynamic and depend on the medium occupation, that is, what channels are used by the UE to transmit and/or receive information. Resource allocation (RA) in a PDCCH points to the occupied channel. For example, if the node is able to access the medium with a successful LBT outcome and reserves the second channel, the first assigned RBG in PDCCH, RBG0 in PDCCH, is found within the second channel since the first channel is not used or occupied. Since only 20 MHz is occupied by the gNB, a finer RBG size will be used as opposed to the case where gNB is occupying all 80 MHz. Depending on the medium occupancy of the gNB, the RBG size can dynamically change.

The data carried on the PDCCH can be referred to as downlink control information (DCI). Multiple wireless devices can be scheduled in one subframe of a radio frame. Therefore, multiple DCI messages can be sent using multiple PDCCHs. The DCI information in a PDCCH can be transmitted using one or more control channel elements (CCE). A CCE can be comprised of a group of resource element groups (REGs). A legacy CCE in LTE can include up to nine REGs. Each legacy REG can be comprised of four resource elements (REs). Each resource element can include two bits of information when quadrature modulation is used. Therefore, a legacy CCE can include up to 72 bits of information. When more than 72 bits of information are used to convey the DCI message, multiple CCEs can be employed. The use of multiple CCEs can be referred to as an aggregation level. In one example, the aggregation levels can be defined as 1, 2, 4 or 8 consecutive CCEs allocated to one legacy PDCCH.

Figure 6:
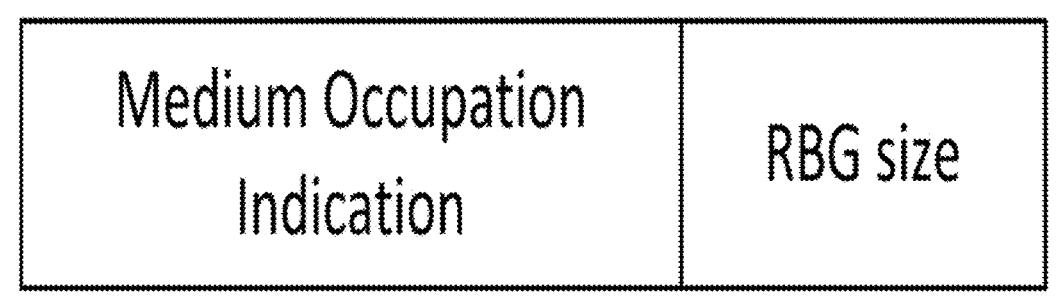

In a first solution, the gNB sends information on a separate physical layer channel (i.e., L1 channel) to the UE that so much bandwidth is occupied along with the RBG granularity in PRBs, where the L1 channel is the over the air physical layer. More specifically, the gNB uses a separate signaling carried on the L1 channel to indicate to the UE that it occupies the medium along with the RBG size. For example, a node may indicate that it has medium access on an 80 MHz channel with an RBG size being X RB, or it may indicate that it has medium access on a 20 MHz channel with an RBG size being Y RB. In one example, Y RB is smaller in size than X RB. For example, when a gNB occupies 80 MHz, it uses an RBG size of 16 PRB, while when it occupies 20 MHz, it uses RBG size of 4 PRB. The separate L1 layer can carry channels common to the gNB or a group of UEs associated with the gNB like the PCFICH as opposed to being UE specific like the PDCCH. The UE may also be configured with a channel and an RBG size using a message from the RRC called the RRC configuration message as shown in FIG. 6. The actual RBG used for resource allocation (RA) for each UE can be min (RRC RBG, L1 RBG), where RRC RBG is the RBG size configured in the RRC layer and L1 RBG is the RBG size signaled on the L1 layer.

To improve robustness, such information carried on the L1 layer can be transmitted in the first slot of the TXOP and repeated in the subsequent slots of the TXOP.

In a second solution, a node indicates the medium occupation in information carried on a separate common L1 channel, but the RBG size is not signaled. Instead, there is an implicit mapping between the RBG size and the medium occupation or the configured BWP. Such implicit mapping can be either predefined or configured to UE. In this example, the UE is preconfigured with a mapping of medium occupation to RBG size. FIG. 7 illustrates an exemplary mapping of medium occupation to RBG size for one to four channels, where 20 MHz equals one channel, 40 MHz equals two channels, 60 MHz equals three channels and 80 MHz equals four channels and the corresponding RBG size is RBGX1, RBGX2, RBGX3, and RBGX4. For example, if the RBG size is X PRB, the node can transmit on an 80 MHz, channel, while if the RBG size is Y PRB, the node transmits on a 20 MHz channel. For example, when a gNB occupies 80 MHz, it uses an RBG size of 16 PRB, while when it occupies 20 MHz, it uses RBG size of 4 PRB. Note that the mapping between the channel occupation (or configured bandwidth (BWP)) to RBG size can be UE-specific.

In a third solution, a node indicates the medium occupation in a UE specific signaling channel for a UE like the C-RNTI PDCCH. A separate channel is not used to signal the medium occupation since the PDCCH has a field that can be used to carry resource allocation. However, like the second solution, there is an implicit or predefined mapping between the channel occupation (or configured bandwidth (BWP)) and the RBG size. The UE interprets the RBG size based on the medium occupation accordingly. The implicit mapping is similar to the second solution. So whereas before a common signal carried on the L1 layer was used to convey medium occupation to configure a UE with a BWP, here a UE specific PDCCH is used. In both solutions RBG size is implicitly mapped to the medium occupation. In one example, the UE can be preconfigured with the table shown in FIG. 7. Also, here a bitmap may be used. For example, with an 80 MHz system bandwidth comprising four 20 MHz channels, a 4-bit bitmap may be introduced at the PDCCH. gNB indicates the medium occupation via the bitmap and, the UE interprets the RBG size based on the medium occupation. See FIG. 8, which discloses using a bitmap to configure a UE with a channel and an RBG size. In one example, at least one bit in the bitmap represents one or more RBGs. If the resource allocation is RBG based, the bitmap may indicate the first and the last RBG that is occupied by the UE.

An additional guard band may be used if a node is able to access the medium with a successful LBT outcome and reserves some, but not all channels, such that not all of the BW is occupied. For example, if a node reserves the 20 MHz channel, but not the 40 MHz, 60 MHz, or 80 MHz channels, it may perform better by adding additional guard band on each side of the 20 MHz bandwidth to accommodate the adjacent channel leakage-power ratio (ACLR). Power that leaks from a transmitted signal into adjacent channels in a digital communication system such as LTE is referred to as ACLR. It can impair system performance by interfering with transmissions in neighboring channels which are not occupied by the current node. Thus, system transmitters perform within specified limits to avoid ACLR. On the other hand, the 20 Mhz channel may not use any guard band if a node gains access to all the channels which in one example is the four 20 MHz channels. In this example, the UE occupies the entire bandwidth which is 80 MHz so adjacent channel leakage across each 20 MHz channel is not a concern.

Figure 9A:
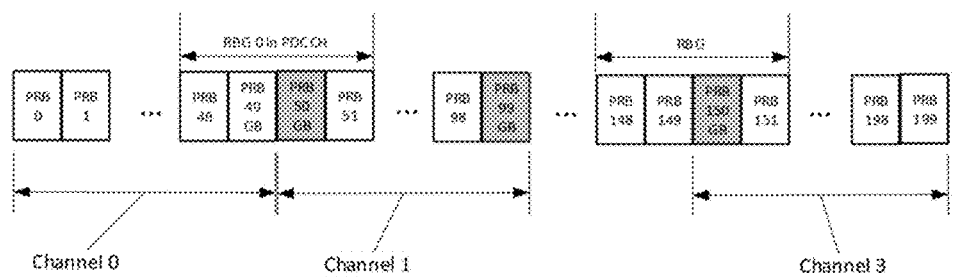
FIG. 9A illustrates an allocation of PRBs and RBGs to channels 0 thru 3, where 50 PRBs per channel are allocated, along with an RBG size of 4 PRBs.

In one example, an RBG grid based on absolute PRB0 with respect to the system bandwidth is used. Assuming the system BW is 80 MHz, the PRB index can be defined to be consistent with the 80 MHz even if the node occupies less than the full 80 MHz system BW, e.g., it occupies only one of the 20 MHz channels. In this case the PRB index is still followed and the PRB index is defined according to the 80 MHz case even though a fraction of the 80 MHz is occupied. The UE can translate the assigned RB/RBGs/interlaces to the occupied channel. The RBG grid based on system bandwidth may not align with each channel. Depending on the RBG size, the PRBs across different channels may fall into the same RBG. For example, FIG. 9A illustrates an allocation of PRBs and RBGs to 4 channels. In FIG. 9A, which will be discussed in further detail below, one RBG (i.e., the RBG0 signaled in PDCCH) consists of 4 PRBs. UE can translate RBG0 in PDCCH, together with medium occupancy information to PRBs 48, 49, 50 and 51. Here the first 2 PRBs of RBG0, PRBs 48 and 49 belong to Channel 0, while the last 2 PRBs of RBG 0 (PRBs 50 and 51), belong to Channel 1. In addition, the PRBs in the guard band may fall into the RBG as well when a guard band is used as shown with PRBs 49 and 50.

In one example, a guard band is configured for each channel. The UEs will calculate the transport block size (TBS) using the usable RBs falling into the occupied channel and rate match accordingly. Data from the upper layer (or MAC layer) received by the physical layer in an LTE system is called a transport block. In one example, the number of Physical Resource Blocks (NPRB) and the MCS (Modulation and Coding Scheme) are used to compute the transport block size.

As stated above, the RBG size depends on the medium occupancy but the PRG may be defined with respect to the system bandwidth. The larger the medium occupancy, the greater the number of PRB units used in an RBG. For example, when an RBG size is 2 physical resource blocks (PRB), RBG 0 consists of PRB 0 and PRB1, and RBG 50 consists of PRB 100 and PRB 101. In another example, when RBG size is 3 RBs, RBG 1 consists of PRB 0, PRB1 and PRB2 and RBG 50 consists of PRB 150, PRB151 and PRB 152.

In one example, the guard band can be defined in the unit of PRBs. When mini-PRBs are used, the guard band can be measured in units of mini-PRBs. When a node is not able to access the medium with a successful LBT outcome and reserves a channel, the RBGs fully in the channel (including the guard band on either left or right when used) are not counted in the actual resource allocation. A PRB consists of 12 subcarriers while a mini-PRB stands for a fraction of RB which consists of less than 12 PRBs. For example, a mini-PRB may consist of 4 sub-carriers.

In one example, assume each channel has 50 PRBs. If the gNB allocates channel 1 and channel 3 (and channels 2 and 4 are not allocated) and the corresponding RBG size is 4 RB, then RBG 0 would comprise of PRBs 48-51 as the first 12 RBGs (i.e., which is the first 48 PRBs, PRB 0 thru 47 since each PRG=4 PRBs) are not counted. The first 12 RBGs (along with PRBs 0-47) are not counted because the gNB does not occupy channel 0. Thus, RBG 0 signaled in the PDCCH, the starting RBG is effectively translated from PRBs 0-3 to PRBs 48-51.

When a RBG partially falls into a reserved channel (excluding guard band when used), the usable PRBs in the RBG may be utilized. In the example shown in FIG. 9A, the 13$^{th}$ RBG containing PRBs 48-51 is the first RBG with usable PRBs which in this case is PRB 51. PRB 48 is not usable because it falls in an unoccupied channel and PRBs 49 and 50 are not usable because they fall into the guard band. The UE begins counting PRBs when there is overlap with an occupied channel, in this case channel 1. So RBG 0 has effectively been translated to RBG 12 (i.e., the 13$^{th}$ RBG) by the UE. The remaining RBGs are sequentially numbered for the resource allocation (RA) field.

As stated above, FIG. 9A illustrates an allocation of PRBs and RBGs to 4 channels, channels 0 thru 3, where 50 PRBs per channel are allocated, along with an RBG size of 4 PRBs. Channel 0 spans PRBs 0 to 49. Channel 1 is occupied by PRBs 50 to 99. Channel 2 spans PRBs 100 to 149, and channel 3 is occupied by PRBs 150 to 199. Resource allocation type 0 uses a bitmap to allocate the resources and each bit represents one RBG. The RBG grid is based on the number of PRBs in an RBG corresponding to system bandwidth and may include PRBs from adjacent channels as well as the guard band. If a UE is assigned those RBGs, PRBs from adjacent channels as well as the guard band, it will use the usable PRBs falling into the indicated channel to rate match as well as calculate transport block size (TBS) accordingly. In the present example, the node is able to transmit on channel 1 and channel 3, where the RBG is assumed to be 4 PRBs. The node does not have access to channel 0 or channel 2 and cannot transmit the true PRB0 or RBG0 both of which would be located in channel 0 using the entire system BW, but has been translated to PRBs 48-51 since channel 0 is not occupied by the UE. In the PDCCH, the resource assignment RBG0 tells the UE about the transmission on actual RBG 12 which comprises PRBs 48-51. The PDCCH indicates PRB 51 will be used for transmission as explained below.

Here the UE interprets the RBG0 signaled in PDCCH to the RBG 12 as this is the first RBG which overlaps with channel 1 with useful RBs. But since PRB 48 and 49 fall into channel 0 and PRB 50 is used for a guard band, so the UE knows only PRB 51 can be used to transmit. Thus, the UE will only use PRB 51 to transmit if RBG0 is indicated as occupied and skip PRBs 48-50. This saves resource assignment overhead compared to signaling PRB 51 or RBG 12 explicitly in PDCCH.

Previously, an RBG based resource allocation was discussed. With RBG based resource allocation, a bit can be assigned to one or more RBGs which may be used to indicate whether an RBG is assigned to the UE or not. Alternatively, a compact resource allocation may also be used in NR-SS. With compact resource allocation, a gNB indicates the starting PRB, RBG, or interlace as well as the number of occupied RBs/RBGs/Interlaces that follow to reduce the RA overhead as opposed to RBG based resource allocation by using less bits.

When the channel access is not contiguous, for the compact RA assignment a gNB may indicate a starting point as well as the number of occupied PRBs, RBGs, or Interlaces per channel that follow that staring point. This could result into a large RA overhead. The resource allocation in an LAA system differs from how resources are allocated with LTE. An interlace composed of ten resource blocks equally spaced in frequency within a 20 MHz frequency bandwidth is the basic unit of resource allocation for LTE unlicensed channels.

The present example uses a single starting point of PRBs, RBG, or Interlaces and fixed number of PRBs, RBG, or Interlaces following the starting point irrespective of the channel access. This means that the assignment, from the signaling perspective, may span all the channels without necessarily being able to access or occupy some of the channels. The UE may automatically skip PRBs, RBGs or interlaces in channels that gNB does not have access on along with automatically skipping PRBs found in guard bands. Thus, the PRBs, RBGs, or interlaces in the guard band as well as the unoccupied channels are automatically skipped.

Figure 9B:
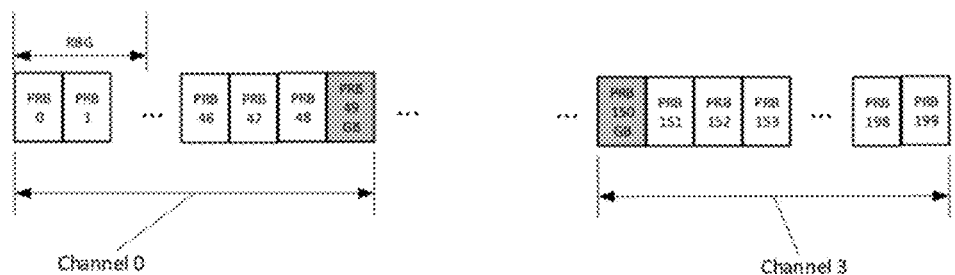
FIG. 9B illustrates an allocation of PRBs and RBGs to channels 0 and 3.

RBs in guard bands and unoccupied channels are automatically skipped when using compact resource allocation (RA). So the present compact method of allocating resources has a single starting point which can be a PRB, an RBG, or an interlace, along with how many PRBs, RBGs, or interlaces are going to be occupied. This applies to RAs with or without hopping. FIG. 9B illustrates an example of this method of allocation. In the illustrated example, channels 0 and 3 are assumed to be occupied by the UE. In the figure shown, there are 50 PRBs per channel, along with an RBG size of 4 PRBs. Channel 0 is occupied by PRBs 0 to 49 and channel 3 is occupied by PRBs 150 to 199. A gNB reserves channels 0 and 3 and assigns a UE with a starting PRB equal to PRB 0 along with a total PRB number of 52 PRBs in this example. In other examples, the total PRB number can be different than 52. In this example, the UE has already been signaled by the gNB that it has access on channels 0 and 3. If the UE receives an assignment from the gNB where the starting PRB is PRB 0 and the transmission occupies 52 PRBs, it will know that the transmission actually spans PRBs 0 to 48 (49 PRBs located in channel 0) as well as PRB 151, 152 and 153 (3 PRBs located in channel 3) while skipping all the PRBs in between that it does not occupy like PRBs in channels 1 and 2, PRBs 50 to 149, along with PRBs found in guard bands like PRB 49 and PRB 50. The UE will automatically skip the RBs in the guard band as well as the RBs in channels 1 and 2 to obtain the actual RBs usable for transmission or reception. PRB 49 and PRB 150 are skipped because they are guard bands (GB) for channels 0 and 3 respectfully. PRBs 50 to 149 are skipped because they are located in channels 1 and 2 which are not occupied by the UE. To get to 52 occupiable PRBs, PRBs 0 to 48 in channel 1 are used along with PRBs 151 to 153 in channel 3. This allocation starts with PRB 0 and spans a total of 52 usable PRBs. Thus, the resources are allocated by indicating starting PRB 0 and along with indicating a length of 52 usable PRBs. This is less overhead than indicating a starting point of PRBs, RBG, or interlaces and a length of PRBs, RBG, or interlaces for each channel with medium access.

Figure 10A:
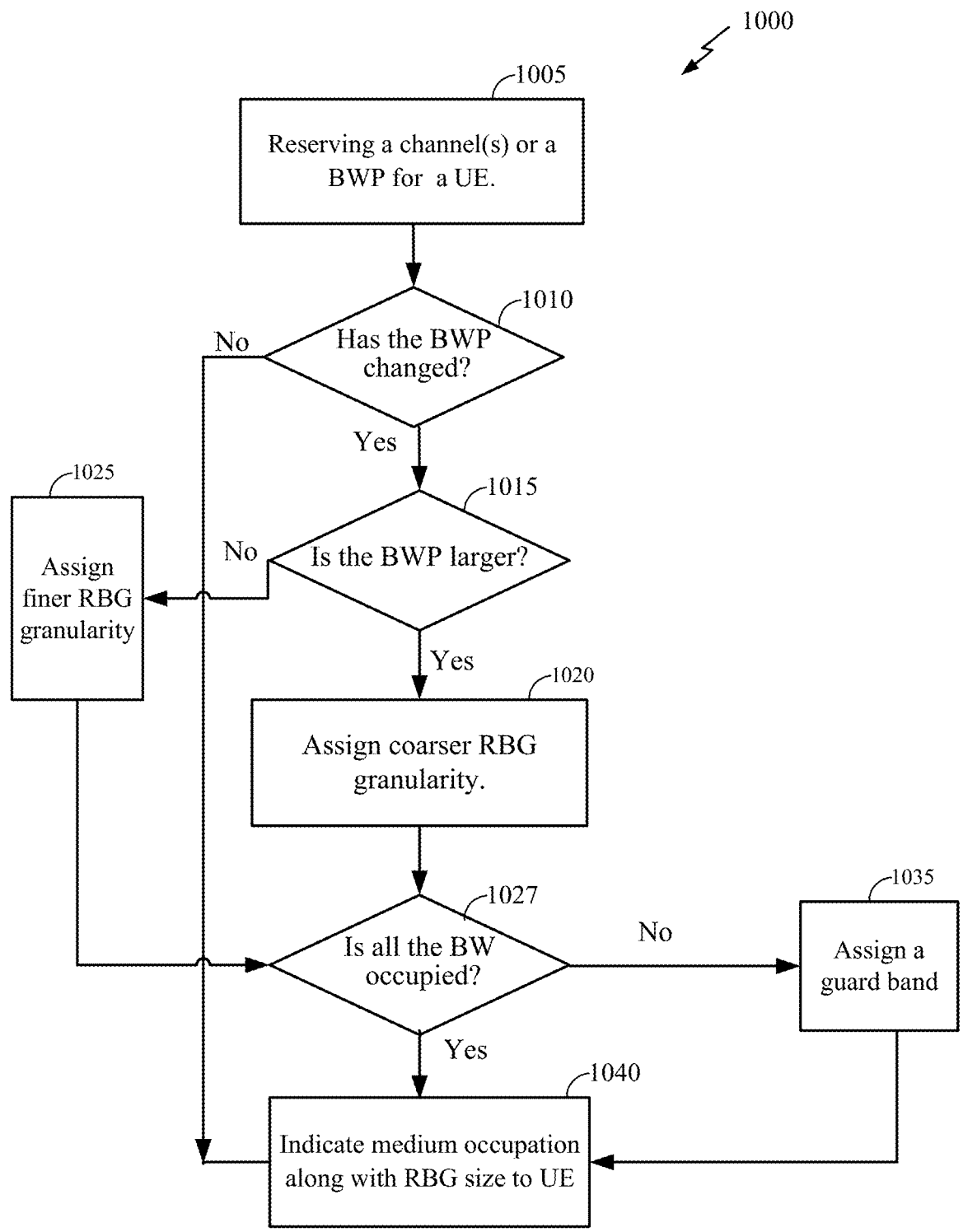
FIG. 10A is a flowchart of the steps taken by a BS to indicate medium occupation along with RBG size to UE.

FIG. 10A is a flowchart of the steps taken by a gNB to indicate medium occupation along with RBG size to a UE. The TRPs 208 shown in FIG. 2 is an example of the gNB. Initially, a gNB allocates physical resource blocks for a UE (step 1005). Then the gNB determines if the medium occupancy has changed (step 1010). The output of step 1010 is Yes if the medium occupancy has changed and No if it hasn't. So if the answer to step 1010 is Yes, the medium occupancy has changed, another determination is made in step 1015 whether the medium occupancy has gotten larger or smaller, i.e., Yes to step 1015 it has gotten larger or No to step 1015 the medium occupancy has gotten smaller. If the answer to step 1015 is Yes, the medium occupancy has gotten larger, a coarser RBG size is assigned to the UE (step 1020 in FIG. 10A) If the answer to step 1015 is No, the medium occupancy has gotten smaller, a finer RBG granularity is assigned to the UE (step 1025 in FIG. 10A).

Next, the BS determines whether it can occupy all channels or not (step 1027). If the answer is No it is not fully occupied, i.e., the gNB occupies some, but not all channels or bandwidth such that not all of the BW is occupied, an additional guard band is used around the occupied channels (see step 1035). If the answer is Yes, the BW is fully occupied, no extra guard band is assigned. Last in step 1040, the gNB can send information on an indicator, or signal, to the U,E indicating medium occupation and RBG size. In another example, the RBG size could be implicitly determined and not signaled dynamically.

Figure 10B:
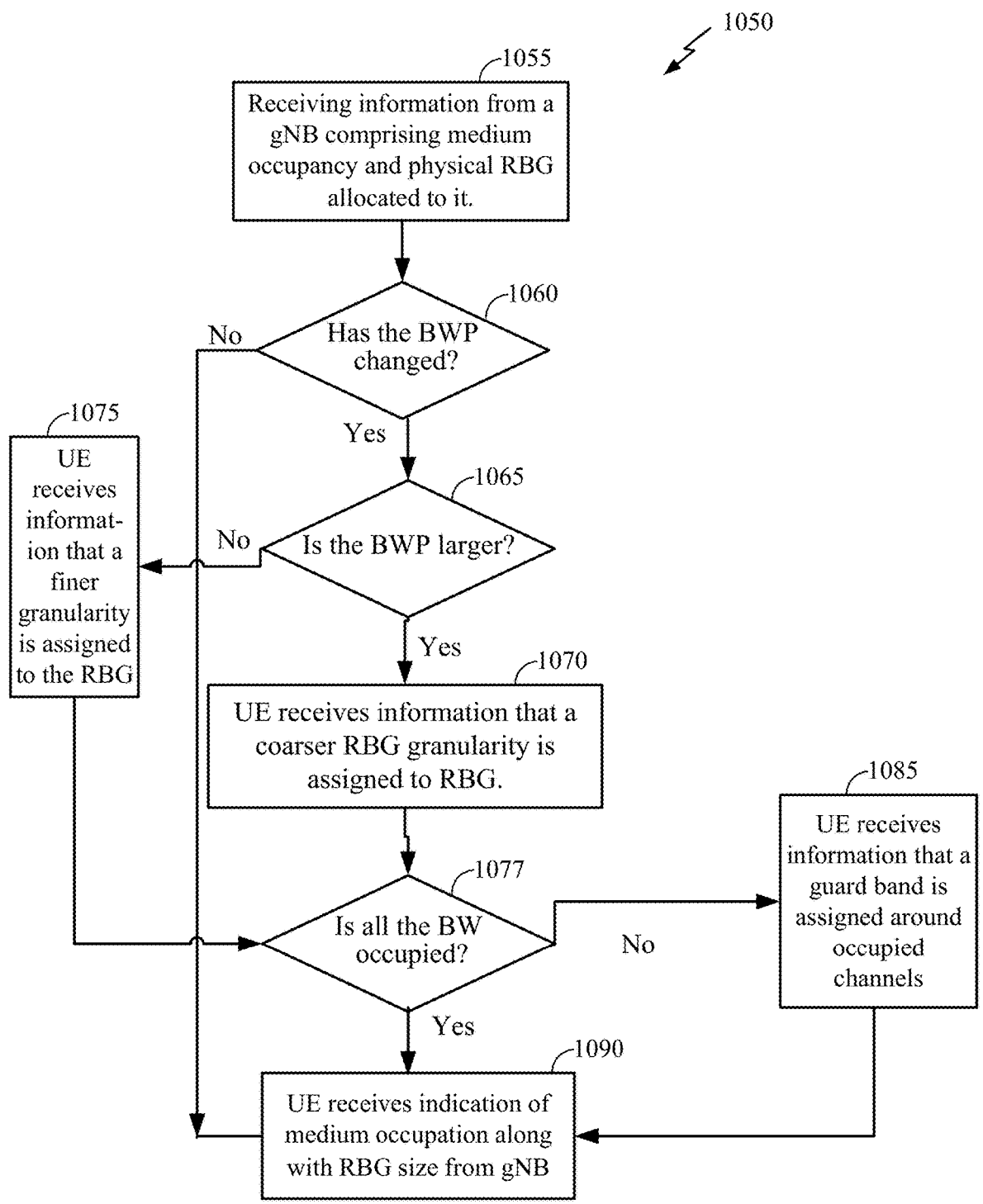
FIG. 10B is a flowchart of the steps taken by a UE when receiving e medium occupation along with RBG size from the BS.

FIG. 10B is a flowchart of the steps taken by a UE to receive medium occupation along with RBG size from a gNB. The UEs 120 shown in FIG. 1 is an example of the UE. Initially, a UE receives information from a gNB comprising medium occupation and physical resource block group (RBG) allocated to it by a gNB (step 1055). Then the UE receives information from the gNB if the medium occupancy has changed (step 1060). The output of step 1060 is Yes if the medium occupancy has changed and No if it hasn't. So if the answer to step 1060 is Yes, the medium occupancy has changed, the UE finds out in step 1065 whether the medium occupancy has gotten larger or smaller, i.e., Yes to step 1065 it has gotten larger or No to step 1065 the medium occupancy has gotten smaller. If the answer to step 1065 is Yes, the medium occupancy has gotten larger, a coarser size is assigned to the RBG and received by the UE (step 1070 in FIG. 10B) If the answer to step 1065 is No, the medium occupancy has gotten smaller, a finer granularity is assigned to the RBG and received by the UE (step 1075 in FIG. 10B).

Next, the UE is informed whether all channels are occupied or not (step 1077). If the answer is No they are not fully occupied, i.e., the BS occupies some, but not all channels or bandwidth such that not all of the BW is occupied, the UE receives information that an additional guard band is assigned around the occupied channels (see step 1085). If the answer is Yes, the BW is fully occupied, no extra guard band is assigned. Last in step 1090, the UE receives information on an indicator, or a signal, from the gNB indicating medium occupation and RBG size. In another example, the RBG size could be implicitly determined and not signaled dynamically.

A compact RA indication and medium occupation index may be sent separately or sent using joint coding. Joint coding may further help reduce the number of bits in some cases and reduce RA overhead.

In the example with 4 channels, 20/40/60/80 MHz, has a total of 200 PRBS, where each channel has 50 PRBs. A starting PRB can be anywhere among the 200 PRBs, PRB 0 to PRB 199 and the length can be anywhere from 1 to 199 PRBs. A bitmap may be used for a medium occupation index, with the bitmap using 4 bits.

If the resource allocation is not jointly coded and sent for all 4 channels, each channel having N physical resource blocks (N PRBs), then ceil(log 2 (4NRB*(4NRB+1)/2)) bits would be used for compact RA indication (assuming 1 RB granularity in the allocation) using the RIV based mapping. In this example, each channel may have 50 PRBs so N=50.

One example of joint coding would be to indicate a starting PRB in the first allocated channel and the ending PRB in the last allocated channel. Also, medium occupancy on the first and last allocated channel. This would use ceil(log 2 (NRB)+log 2(NRB)) bits. With N=50, log 2 (50)=5.64 and log 2 (NRB)+log 2(NRB) bits=5.64+5.64=11.28 bits, which is around 3 bits less than using separate coding. In FIG. 9B, the starting PRB is PRB 0 in channel 0 and the ending PRB is the $4^{th}$ PRB in channel 3 which is PRB 153. So log 2 (NRB) bits are used to indicate the starting PRB in channel 0 and log 2(NRB) bits are used to indicate the ending PRB in channel 3. And the UE has already been indicated with the medium occupancy information so it knows that the starting PRB points to channel 0 and the ending PRB points to channel 3. So the medium occupancy between the starting and ending PRBs/RBGs/Interlaces are also known to the UE.

Figure 11A:
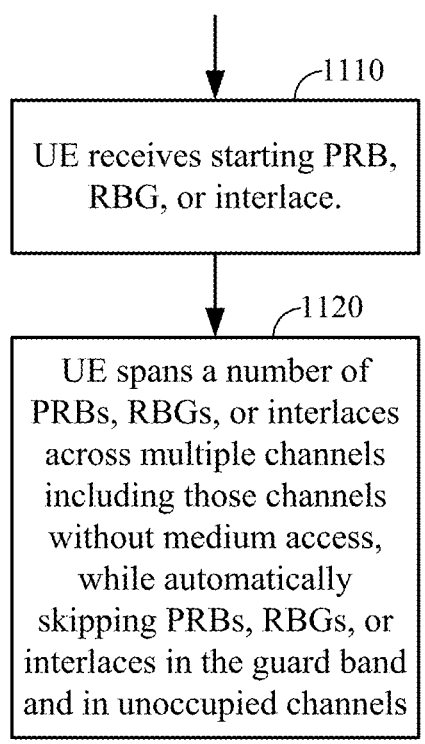
FIG. 11A is a flowchart of the steps taken to reduce resource allocation overhead by receiving a starting PRB, RBG, or interlace, spanning a number of said RBs, RBGs, or interlaces across multiple channels including those channels without medium access, and automatically skipping PRBs, RBGs, or interlaces in the guard band and in unoccupied channels.
Figure 11B:
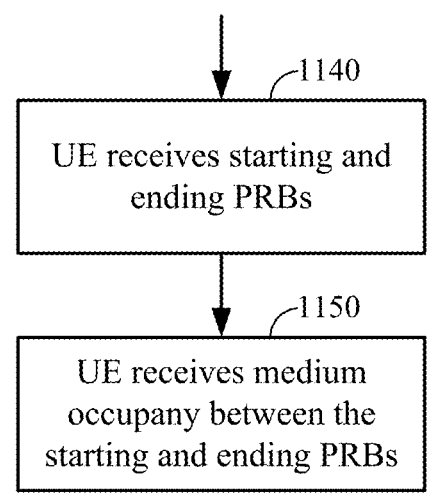
FIG. 11B is a flowchart of the steps taken to reduce resource allocation overhead by joint coding a resource allocation (RA) indication and a medium occupation index.

FIG. 11A is a flowchart of exemplary steps taken to reduce resource allocation (RA) overhead. In step 1110, the UE receives a starting PRB, RBG, or interlace from a gNB in one example. In step 1120, the transmission received by the UE spans a number of the RBs, RBGs, or interlaces across multiple channels including those channels without multiple access, while automatically skipping PRBs, RBGs, or interlaces in the guard band and in unoccupied channels. Overhead is reduced because the number of PRBs, RBGs, or interlaces transmitted to the UE is reduced. FIG. 11B is a flowchart of exemplary steps taken to reduce resource allocation overhead by joint coding a resource allocation (RA) indication and a medium occupation index. In step 1140 the UE receives a starting PRB in a first allocated channel and an ending PRB in a last allocated channel from the gNB. So instead of receiving information concerning all channels, it receives a starting PRB in a first allocated channel and an ending PRB in a last allocated channel, thereby reducing overhead. In step 1150, the UE receives a medium occupancy between the starting PRB and the ending PRB from the gNB. This received information is used by the UE to determine which RBs, RBGs, or interlaces to use and to skip unoccupied PRBs, RBGs, or interlaces.

Due to power spectral density (PSD) limitations, an interlaced channel structure is used in the unlicensed spectrum for the UE to utilize power more efficiently.

In addition, SC-FDM could be used in UL for a power limited UE due to the better PAPR (peak-to-average power ratio) associated with SC-FDM waveform compared to OFDM waveform.

Figure 12A:
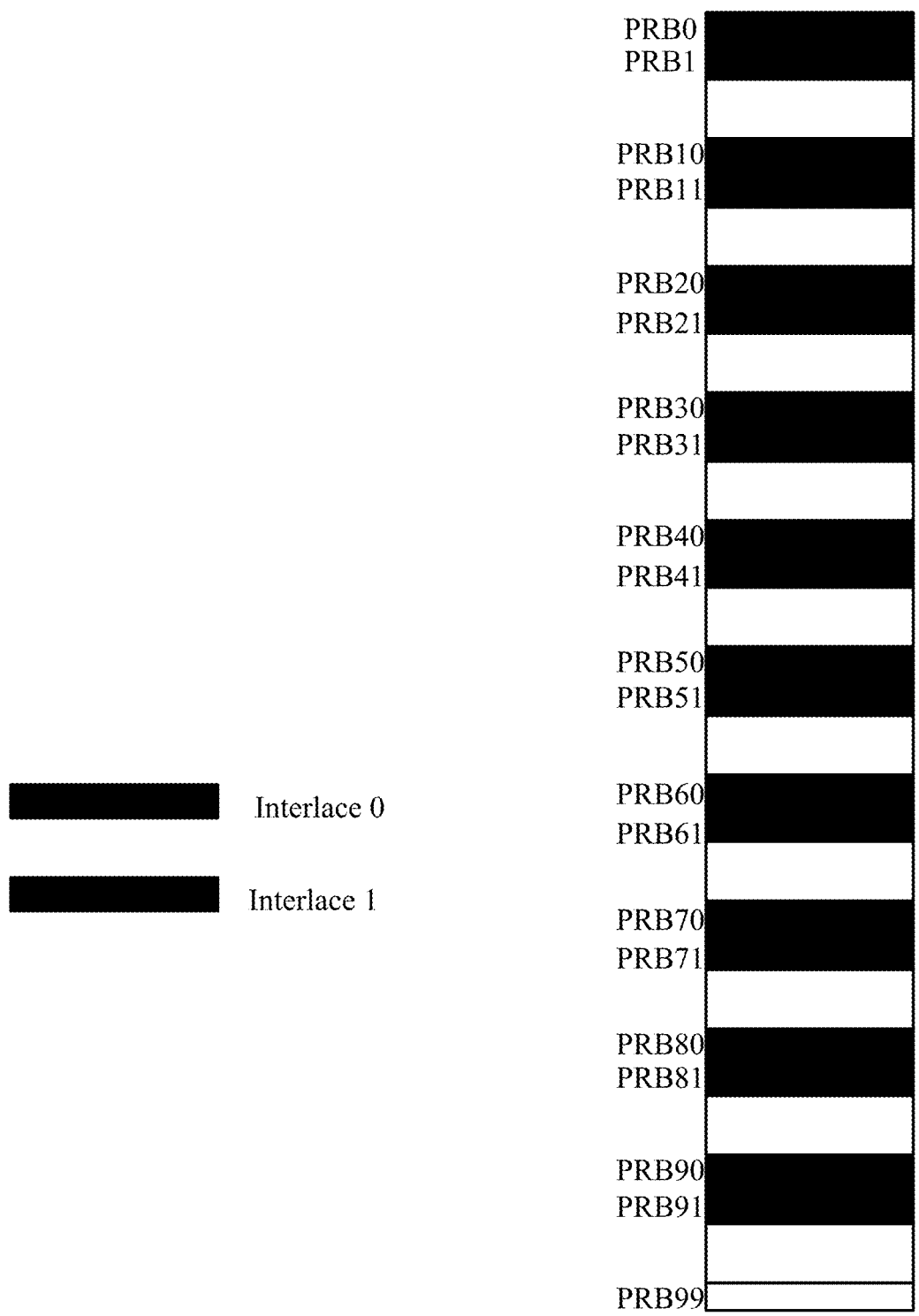
FIG. 12A shows multiple interlaces with multiple equally spaced PRBs, such as a first interlace of PRBs, interlace 0, and a second interlace of PRBs, interlace 320.

FIG. 12A shows multiple interlaces with multiple equally spaced PRBs, such as a first interlace of PRBs, interlace 0, and a second interlace of PRBs, interlace 1. An interlace may include multiple PRBs that spread throughout the Component Carrier system bandwidth. For example, for 20 MHz bandwidth, in some deployments, there are 100 PRBs (e.g., PRB #0 through PRB 99). In some examples, the first interlace of PRBs, interlace 0, may include RB #0, 10, 20, . . . 90, the second interlace of RBs, interlace 1 may include RB #1, 11, 21, . . . 91, and so on. With a first example, an interlace structure is defined for each channel. (Excluding the potential guard band. The guard band is excluded because if it is included, the UE may not be able to check out the medium). An interlace is composed of N physical resource blocks (PRB) equally spaced in frequency. In one example, there are equally spaced in frequency PRBs on an interlace for a channel. In the 80 MHz system discussed earlier, the channel could be 20 MHz, 40 MHz, 60 MHz, or 80 MHz. Here there is a cluster of interlaces, interlace 0 and interlace 1, with PRBs spaced every 10 PRBs. In FIG. 12B, interlace 1 has PRBs that are spaced every 10 PRBs. However, with multiple channels, the clusters may not be equally spaced due to the guard bands. So its preferred that the interlace assignment does not go beyond one interlace per channel. If the UE is assigned on more than one channel, a non-interlaced structure can be used for channels other than the first interlaced channel.

In a second example, the interlace may be defined with respect to the system bandwidth and not a particular channel such as the 80 MHz system BW which included 4 channels (20/40/60/80 MHz) of 20 MHz BW each as discussed earlier. See FIG. 12C where interlace 2 has PRBs that are equally spaced 10 PRBs apart across four 20 MHz channels. For example, the UE may be assigned a cluster of interlaces or cluster of partial interlaces with equally spaced PRBs across the entire system bandwidth and not just one channel. Note if an interlace consists of PRB 0, 10, 20, . . . , 390, etc., a partial interlace may not need to use all of the RBs in an interlace. Here, the interlace may have 400 PRBs with 10 PRB spacing resulting in 40 PRBs equally spaced) A partial interface could be assigned to a UE with PRB 0, 10, 20, . . . , 150 (i.e., a total 16 PRBs with 10 PRB equal spacing) as an example. Thus, the UE can be assigned with multiple continuous clusters of one or more interlaces or partial interlaces which can span more than one channel.

Figure 13:
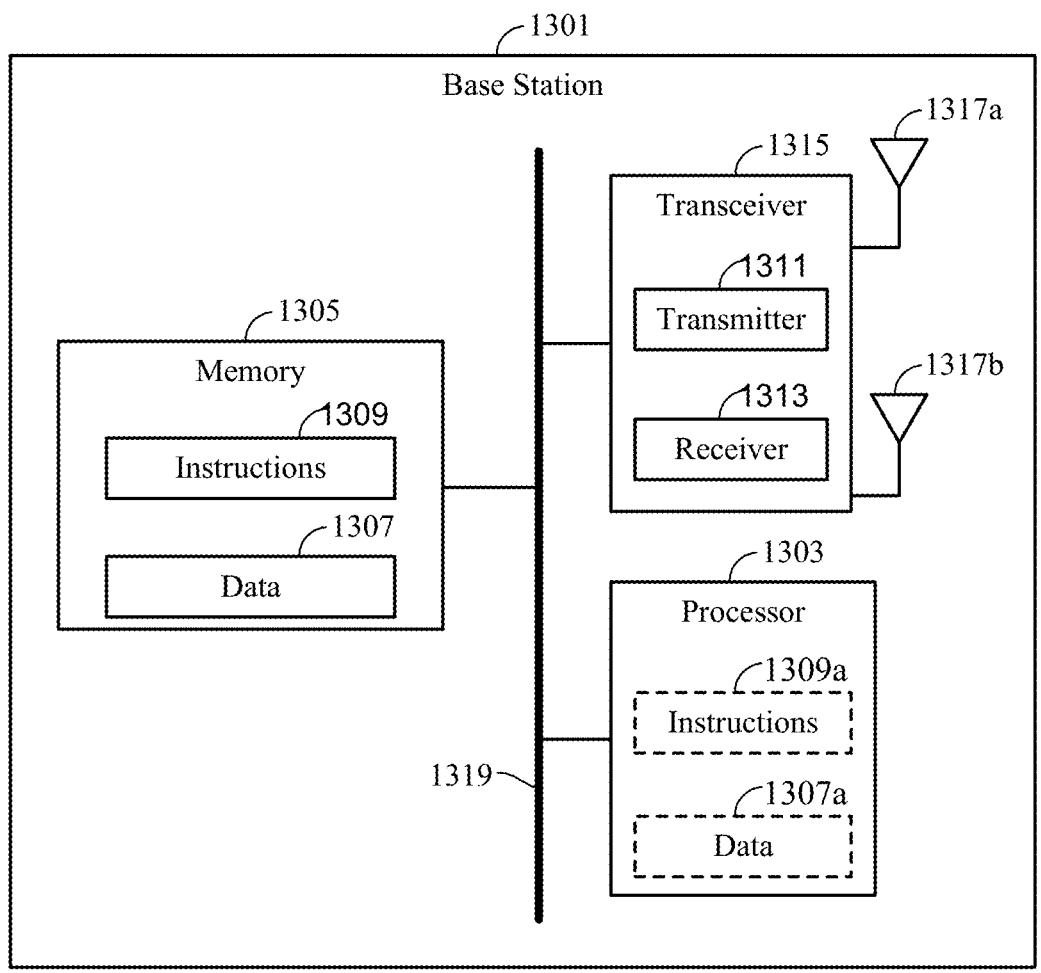
FIG. 13 illustrates certain components that may be included within a base station.

FIG. 13 illustrates certain components that may be included within a base station 1301. The base station 1301 may be an access point, a NodeB, an evolved NodeB, etc. The base station 1301 includes a processor 1303. The processor 1303 may be a general purpose single- or multi-chip microprocessor (e.g., an ARM), a special purpose microprocessor (e.g., a digital signal processor (DSP)), a microcontroller, a programmable gate array, etc. The processor 1303 may be referred to as a central processing unit (CPU). Although just a single processor 1303 is shown in the base station 1301 of FIG. 13, in an alternative configuration, a combination of processors (e.g., an ARM and DSP) could be used.

The base station 1301 also includes memory 1305. The memory 1305 may be any electronic component capable of storing electronic information. The memory 1305 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1307 and instructions 1309 may be stored in the memory 1305. The instructions 1309 may be executable by the processor 1303 to implement the methods disclosed herein. Executing the instructions 1309 may involve the use of the data 1207 that is stored in the memory 1305. When the processor 1303 executes the instructions 1309, various portions of the instructions 1309a may be loaded onto the processor 1303, and various pieces of data 1307a may be loaded onto the processor 1303.

The base station 1301 may also include a transmitter 1311 and a receiver 1313 to allow transmission and reception of signals to and from the wireless device 1301. The transmitter 1311 and receiver 1313 may be collectively referred to as a transceiver 1315. Multiple antennas 1317a-b may be electrically coupled to the transceiver 1315. The base station 1301 may also include (not shown) multiple transmitters, multiple receivers and/or multiple transceivers.

The various components of the base station 1301 may be coupled together by one or more buses, which may include a power bus, a control signal bus, a status signal bus, a data bus, etc. For the sake of clarity, the various buses are illustrated in FIG. 13 as a bus system 1319. The functions described herein in the flowchart of FIG. 10, may be implemented in hardware, software executed by a processor like the processor 1303 described in FIG. 13.

Figure 14:
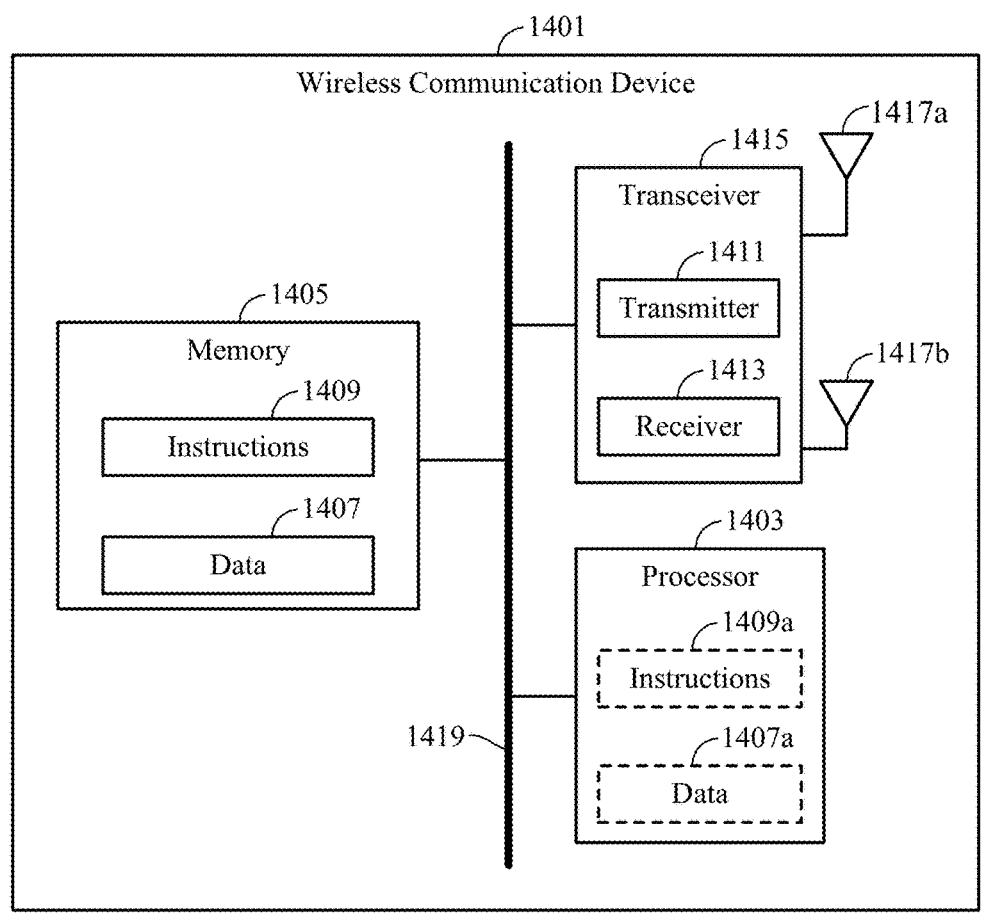
FIG. 14 illustrates certain components that may be included within a wireless communication device.

FIG. 14 illustrates certain components that may be included within a wireless communication device 1401. The wireless communication device 1401 may be an access terminal, a mobile station, a user equipment (UE), etc. The wireless communication device 1401 includes a processor 1303. The processor 1403 may be a general purpose single- or multi-chip microprocessor (e.g., an ARM), a special purpose microprocessor (e.g., a digital signal processor (DSP)), a microcontroller, a programmable gate array, etc. The processor 1403 may be referred to as a central processing unit (CPU). Although just a single processor 1403 is shown in the wireless communication device 1401 of FIG. 14, in an alternative configuration, a combination of processors (e.g., an ARM and DSP) could be used.

The wireless communication device 1401 also includes memory 1405. The memory 1405 may be any electronic component capable of storing electronic information. The memory 1405 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1407 and instructions 1409 may be stored in the memory 1405. The instructions 1309 may be executable by the processor 1403 to implement the methods disclosed herein. Executing the instructions 1409 may involve the use of the data 1407 that is stored in the memory 1405. When the processor 1403 executes the instructions 1409, various portions of the instructions 1409a may be loaded onto the processor 1403, and various pieces of data 1407a may be loaded onto the processor 1403.

The wireless communication device 1401 may also include a transmitter 1411 and a receiver 1413 to allow transmission and reception of signals to and from the wireless communication device 1401. The transmitter 1411 and receiver 1413 may be collectively referred to as a transceiver 1415. Multiple antennas 1417a-b may be electrically coupled to the transceiver 1415. The wireless communication device 1401 may also include (not shown) multiple transmitters, multiple receivers and/or multiple transceivers.

The various components of the wireless communication device 1401 may be coupled together by one or more buses, which may include a power bus, a control signal bus, a status signal bus, a data bus, etc. For the sake of clarity, the various buses are illustrated in FIG. 14 as a bus system 1419. It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for receiving on transmit and transmitting on receive. The functions described herein in the flowchart of FIGS. 11A and 11B may be implemented in hardware, software executed by a processor like the processor 1403 described in FIG. 14.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2"

(3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for receiving on transmit and transmitting on receive. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of receiving resources at a user equipment (UE), the method comprising:
   receiving information comprising a medium occupation and a resource block group (RBG) size from a gNB, wherein the RBG size is based on medium occupancy; and
   reducing resource allocation (RA) overhead by:
      receiving a starting physical resource block (PRB), RBG, or interlace;
      spanning a number of PRBs, RBGs, or interlaces across multiple channels including unoccupied channels and guard bands; and
      automatically skipping PRBs, RBGs, or interlaces in the guard bands and in the unoccupied channels.

2. The method according to claim 1, further comprising receiving an additional guard band around each side of the occupied medium.

3. The method according to claim 1, wherein the information comprising the medium occupation and the RBG size is from a radio resource control (RRC) layer or is predefined.

4. The method according to claim 1, wherein the information comprising the medium occupation is carried by a common signal on an L1 channel, and wherein there is an implicit mapping between the RBG size and the medium occupancy.

5. The method according to claim 1, wherein the information comprising the medium occupation is indicated by a bitmap and received by the UE on a UE specific channel, wherein at least one bit in the bitmap represents one or more RBGs; and wherein there is an implicit mapping between the RBG size and a configured bandwidth part (BWP).

6. The method according to claim 1, further comprising:
further reducing RA overhead by joint coding a RA indication and a medium occupation index, wherein reducing RA overhead comprises:
receiving the starting PRB in a first allocated channel and an end PRB in a last allocated channel; and
receiving the medium occupancy indicating the first and the last allocated channel.

7. The method according to claim 1, further comprising:
receiving access to at least one interlace of equally spaced PRBs across one channel of the UE.

8. The method according to claim 1, further comprising:
receiving access to at least one interlace or one partial interlace of equally spaced PRBs across a plurality of channels within a system bandwidth.

9. The method according to claim 2, wherein the guard band is assigned around the occupied medium to avoid adjacent channel leakage-power if the occupied medium is not fully occupied.

10. The method according to claim 4, wherein the information carried on the L1 channel is transmitted in the first slot of a transmit opportunity (TXOP) and repeated in subsequent slots of the TXOP.

11. The method of claim 1, wherein the medium occupation is based on a listen before talk (LBT) procedure performed by the gNB.

12. The method of claim 1, wherein the medium occupancy corresponds to one or more channels that are currently accessible to the gNB and the UE.

13. The method of claim 1, wherein a larger medium occupancy corresponds to a coarser RBG size.

14. The method of claim 1, wherein a smaller medium occupancy corresponds to a finer RBG size.

15. An apparatus for receiving resources at a user equipment (UE), the apparatus comprising:
means for receiving information comprising a medium occupation and a resource block group (RBG) size from a gNB, wherein the RBG size is based on a medium occupancy; and
means for reducing resource allocation (RA) overhead, comprising:
means for receiving a starting physical resource block (PRB), RBG, or interlace;
means for spanning a number of PRBs, RBGs, or interlaces across multiple channels including unoccupied channels and guard bands; and
means for automatically skipping PRBs, RBGs, or interlaces in the guard bands and in the unoccupied channels.

16. The apparatus according to claim 15, further comprising means for receiving an additional guard band around the occupied medium.

17. The apparatus according to claim 15, wherein the information comprising the medium occupation and the RBG size is from a radio resource control (RRC) layer or is predefined.

18. The apparatus according to claim 15, wherein the information comprising the medium occupation is carried by a common signal on an L1 channel, and wherein there is an implicit mapping between the RBG size and the medium occupancy.

19. The apparatus according to claim 15, wherein the information comprising the medium occupation is indicated by a bitmap and received by the UE on a UE specific channel, wherein at least one bit in the bitmap represents one or more RBGs, and wherein there is an implicit mapping between the RBG size and a configured bandwidth part (BWP).

20. The apparatus according to claim 15, further comprising:
means for receiving access to at least one interlace of equally spaced PRBs across one channel of the UE.

21. The apparatus according to claim 15, further comprising:
means for receiving access to an interlace or one partial interlace of equally spaced PRBs across a plurality of channels within a system bandwidth.

22. The apparatus according to claim 16, wherein the guard band is assigned around the occupied medium to avoid adjacent channel leakage-power if the occupied medium is not fully occupied.

23. The apparatus according to claim 18, wherein the information carried on the L1 channel is transmitted in the first slot of a transmit opportunity (TXOP) and repeated in subsequent slots of the TXOP.

24. An apparatus to receive resources at a user equipment (UE), the apparatus comprising:
a memory; and
a processor coupled to the memory, the processor configured to:
receive information comprising a medium occupation and a resource block group (RBG) size from a gNB, wherein the RBG size is based on a medium occupancy; and
reduce resource allocation (RA) overhead by joint coding a RA indication and a medium occupation index, wherein reducing RA overhead comprises:
receive a starting physical resource block (PRB) in a first allocated channel and an end PRB in a last allocated channel and
receive the medium occupancy indicating the first and the last allocated channel.

25. The apparatus according to claim 24, wherein the processor is further configured to receive an additional guard band around each side of the occupied medium.

26. The apparatus according to claim 24, wherein the information comprising the medium occupation and the resource block group (RBG) RBG size is from a radio resource control (RRC) layer or is predefined.

27. The apparatus according to claim 24, wherein the information comprising the medium occupation is carried by a common signal on an L1 channel, and wherein there is an implicit mapping between the RBG size and the medium occupancy.

28. The apparatus according to claim 24, wherein the information comprising the medium occupation is indicated by a bitmap and received by the UE on a UE specific channel, wherein at least one bit in the bitmap represents one or more RBGs, and wherein there is an implicit mapping between the RBG size and a configured bandwidth part (BWP).

29. The apparatus according to claim 24, wherein the processor is further configured to:
further reduce RA overhead by:
receive the starting PRB, RBG, or interlace;
span a number of PRBs, RBGs, or interlaces across multiple channels including unoccupied channels and guard bands; and automatically skip PRBs, RBGs, or interlaces in the guard bands and in the unoccupied channels.

30. A non-transitory processor-readable storage medium having stored thereon processor-executable instructions configured to cause a processor of an apparatus to receive resources at a user equipment (UE) by performing operations, the operations comprising:
- receiving information comprising a medium occupation and a resource block group (RBG) size from a gNB, wherein the RBG size is based on a medium occupancy; and
- reducing resource allocation (RA) overhead by joint coding a RA indication and a medium occupation index, wherein reducing RA overhead comprises:
  - receiving a starting physical resource block (PRB) in a first allocated channel and an end PRB in a last allocated channel; and
  - receiving a medium occupancy indicating the first and the last allocated channel.

* * * * *